Jan. 3, 1961  YOSHIKAZU TAGA  2,966,776
PNEUMATIC POWER TRANSMISSION SYSTEM
Filed March 22, 1957  3 Sheets-Sheet 1
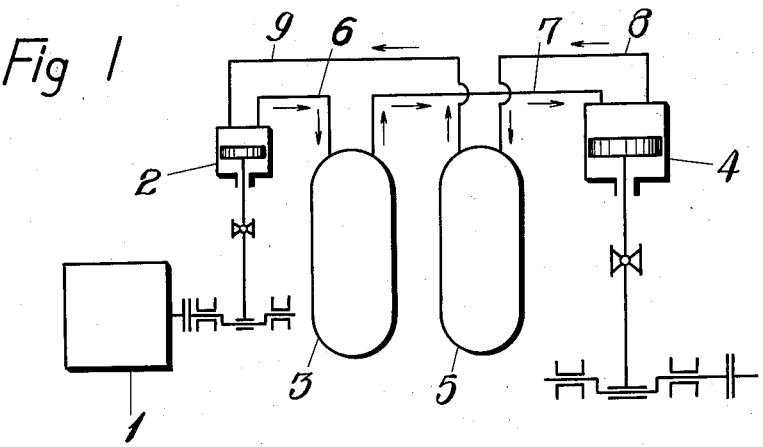
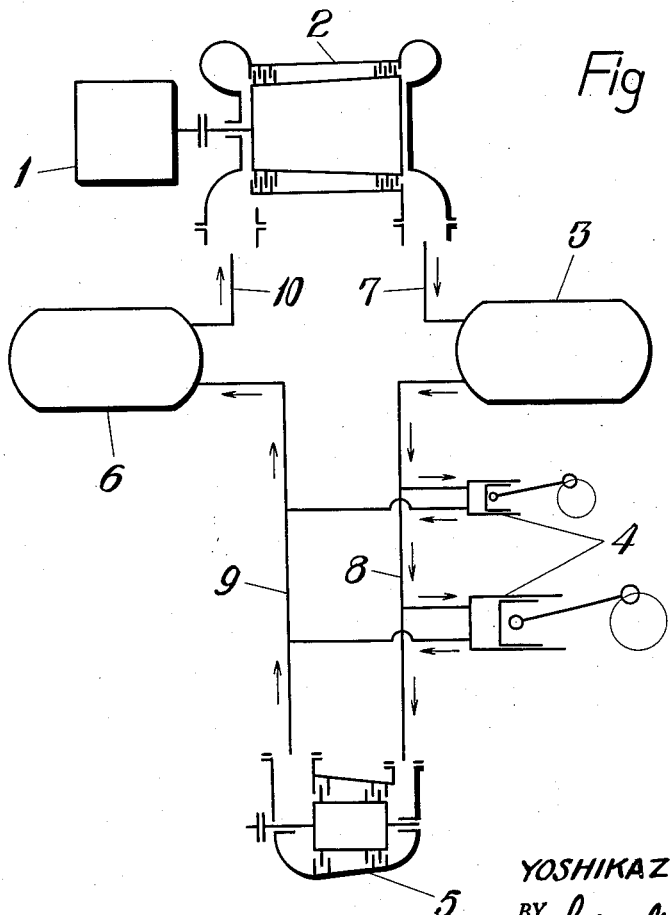
INVENTOR.
YOSHIKAZU TAGA

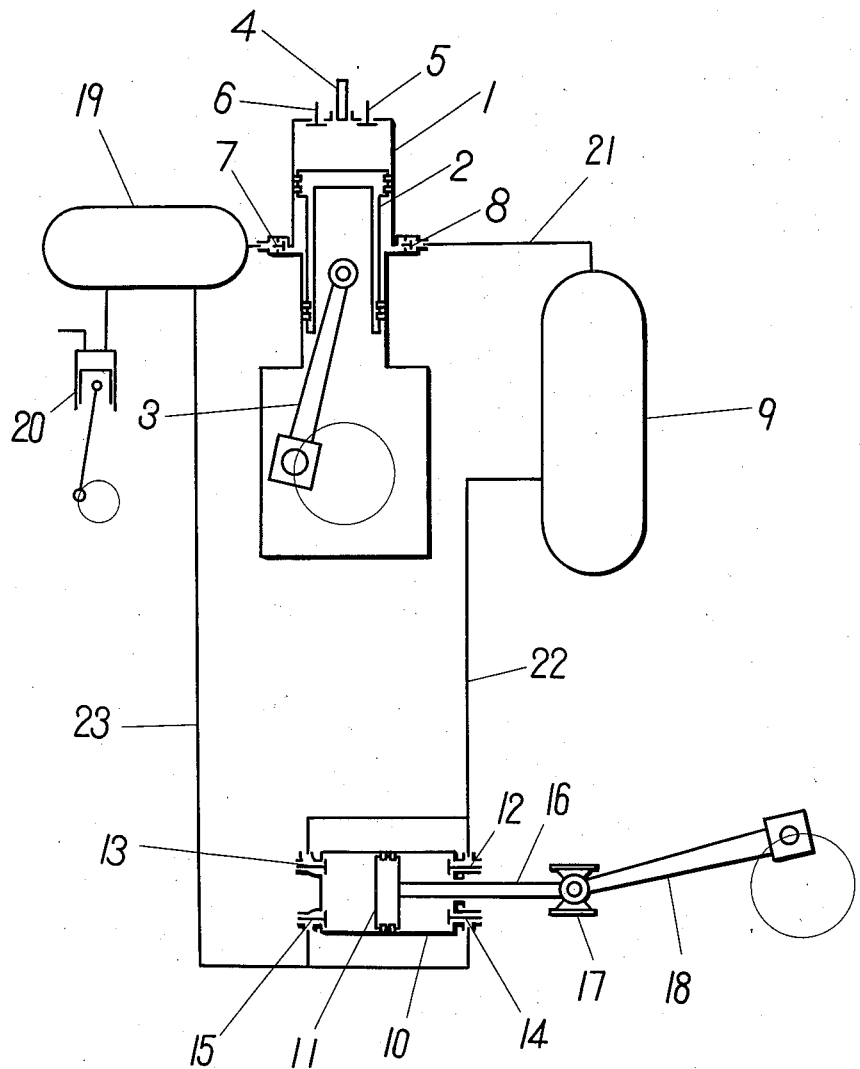

2,966,776

PNEUMATIC POWER TRANSMISSION SYSTEM

Yoshikazu Taga, 29 5-chome, Higashi-dori, Sakurazuka, Toyonaka-shi, Osaka, Japan Filed Mar. 22, 1957, Ser. No. 647,782

Claims priority, application Japan Mar. 26, 1956

1 Claim. (Cl. 60—12)

The invention relates to a pneumatic transmission system using as its medium compressed air recirculating in a closed circuit.

Conventional pneumatic power transmission systems, in which one or more pneumatic motors are driven by compressed air to transmit power to the driven machine are normally of very low efficiency. This unfavourable efficiency is, first attributable to the fact that the adiabatic compression of air gives rise to a temperature increase therein. The heat quantity consumed in the temperature increase is, however, dissipated by radiation in the course of being conveyed through piping to the pneumatic motor, thus the compressed air acting as the working medium for the motor loses considerable energy and there is a reduction in the volume of the compressed air serving as the transmission medium, so that the energy to be spent in the pneumatic motor cylinder is correspondingly decreased. With increase of the compression ratio, this tendency will be further accentuated, as shown by the following data:

| compression ratio | 2 | 3 | 4 | 5 | 6 | 7 |
|---|---|---|---|---|---|---|
| temperature rise, °C | 55 | 92 | 119 | 141 | 162 | 179 |
| efficiency = $\frac{\text{output of pneumatic motor}}{\text{power consumed by compressor}}$ | 85 | 77 | 72 | 69 | 66 | 64 |

Next, the mechanical efficiencies of the compressor as well as of the pneumatic motor must be taken into account. Now assuming that the mechanical efficiency of the compressor amounts to 90% and that of the pneumatic motor be 80%, the resulting combined efficiency will be:

$$0.9 \times 0.8 = 0.72$$

that is to say, it amounts to 72%. When the above given numerical values listed are multiplied by 72%, the following values are obtained:

| compression ratio | 2 | 3 | 4 | 5 | 6 | 7 |
|---|---|---|---|---|---|---|
| efficiency, percent | 61 | 55 | 52 | 50 | 48 | 46 |

Third, the aqueous humidity in the air must be accounted for. When air is compressed, the humidity content contained therein will be liquidized and separated as so-called drain therefrom resulting merely in a loss. The higher compression ratio, the larger becomes the amount separated. Further, leakage, piping and other losses must be considered. When these losses are taken into account, the overall efficiency will be further decreased from those listed above.

In the pneumatic power transmission system according to the present invention, the exhaust port of the pneumatic motor is connected through a piping to the suction port of the compressor, thus providing a closed circuit for the power transmission medium. By this procedure, the suction pressure of the compressor amounts to several atmospheric pressures or a multiple thereof and thus a satisfactory pressure difference will be easily obtained with a low compression ratio. This allows the employment of a correspondingly smaller sized pneumatic motor and a lower compression ratio, thus avoiding the unfavorable efficiency caused by higher compression ratio. A smaller pneumatic motor provides a smaller area of sliding surface, which will, in turn, increase the efficiency by reducing friction loss.

Now assuming that a compression ratio of 2 or lower is employed, the temperature rise will amount to less than 55° C. With this temperature, the temperature difference relative to the atmospheric temperature is small, so that in this case the radiation loss is also insignificant. On the other hand, the compressor sucks in air having a relatively low temperature after dissipation of energy in the pneumatic motor cylinder. When these conditions are considered, the difference in temperature of the delivered air from the compressor relative to atmospheric temperature will amount to only about 20–30° C. This condition ensures a relatively lower radiation loss, which may be of the order of, say, 5%. If the necessary heat insulation is made in a satisfactory manner, the last mentioned energy loss will be further decreased.

Now turning to the mechanical efficiencies, it may be assured, that those of compressor and pneumatic motor are expected to be about 90% and 90%, respectively, based on the observation that the frictional surfaces are much smaller than in conventional systems of similar kind. The overall efficiency will be:

$$0.9 \times 0.9 \times (1-0.05) = 0.77$$

that is to say, 77%. On the contrary thereto, with the known system, the friction loss may amount to as high as 10%, because of the drain loss already explained hereinbefore: With a compression ratio 7, that is, with the compressed air, 7 kg./sq. cm., the overall efficiency taken into account of said friction loss will amount to:

$$0.46 \times 0.9 = 0.41 \quad (\text{or } 41\%)$$

With the present invention, which employs a closed circuit for the transmission medium, the same dry air is recirculated therethrough without such a drain loss as well as appreciable lubricating oil loss.

When an efficiency ratio between the novel and the known pneumatic power transmission system is taken, the following value is thus found:

$$77/41 = 1.88$$

which means a heavy increase in the transmission efficiency in the favor of the present invention.

In an electric power transmission using a generator-motor combination, when assumed:

| | Percent |
|---|---|
| Efficiency of generator | 90 |
| Efficiency of motors: | |
| (when employed a plurality of smaller electric motors) | 80 |
| (or alternatively, when fewer larger electric motors are employed) | 85 | the required overall efficiency will be $$0.9 \times 0.8 \sim 0.9 \times 0.85 = 0.72 \sim 0.77$$

This value means that the power transmission system according to this invention is almost equal in efficiency to the electrical system set forth above.

On the other hand, the system according to this invention can be more easily manufactured at a lower cost and provides a means for easier manipulation of speed within broader limits carried into effect by using a throttle valve, or alternatively by means of a suitable valve mechanism. A further special feature of the present system resides in that there is no trouble caused by overheating, and the invention gives rise to compact design and the possibility of low speed running.

Various further and more specific objects, features and advantages of the invention will appear from the description given below, taken in connection with the accompanying drawings diagrammatically illustrating by way of example several embodiments of this invention.

In the drawings:

Fig. 1 shows a general arrangement of the first embodiment of the invention, in which the air compressor and the pneumatic motor are of the reciprocating type;

Fig. 2 represents a similar view to Fig. 1, showing the second embodiment of the invention, in which the compressor is an axial turbo-compressor and the pneumatic motor of the reciprocating type of the turbo-type, as the occasion may desire;

Fig. 3 shows the third embodiment of the invention, in which the engine and the compressor are united in a combined machine;

Figure 4:
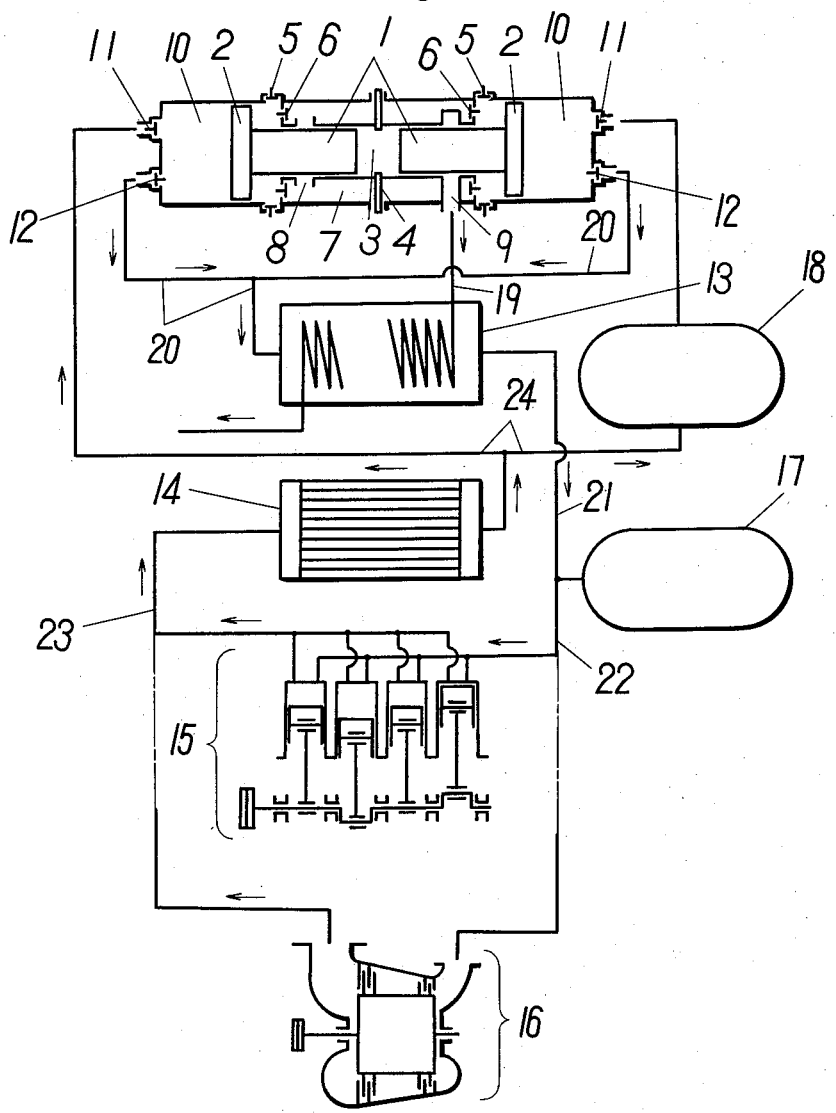
Fig. 4 represents the fourth embodiment of the invention, in which prime mover and compressor are constructed as a free piston type diesel engine-compressor unit and an air heater is provided, the latter being adapted to heat the compressed air delivered from the compressor by the exhaust gases discharged from the engine.

Now referring to the drawings there is shown a prime mover 1, preferably a diesel engine, which is coupled with an air compressor of the reciprocating type, the compressed air delivered from the latter being conveyed through piping 6 to a high pressure air reservoir 3. A pneumatic motor 4 of the reciprocating type is coupled with a suitable driven member, for instance, the driving axle of a locomotive. The working air for the motor 4 is delivered from the high pressure reservoir 3 through piping 7 and the discharged air from said motor is conveyed through piping 8 to a low pressure air reservoir 5 to be accumulated therein. The air is sucked by the compressor 2 through piping 9. The pneumatic motor 4 is illustrated as larger in size than the compressor 2, because of the fact that the motor 4 is adapted to drive the driven member at relatively lower revolutions and thus with a larger torque as the occasion demands.

For the sake of simplicity, the manipulating means inclusive the valve means arranged in the pneumatic circuit has been omitted from the representations in the present and following drawings. The mode of operation of the present transmission system would be clear to those skilled in the art, when they read the above explanation in combination with the introduction hereinbefore disclosed.

In the second embodiment of this invention shown in Fig. 2, 1 denotes again a prime mover, preferably a diesel engine, which is, however, in this case coupled with an axial flow turbo-compressor 2, the delivery-side of which is connected through piping 7 to a high pressure air reservoir 3. The working air for one or more pneumatic motors 4 of the reciprocating type is supplied from the latter through piping 8. The crankshaft of each motor 4 is direct-connected to a member to be driven, for instance, a driving axle of a locomotive (not shown) as in the previous embodiment. The air discharged from said motors 4 is conveyed through piping 9 into a low pressure air reservoir 6 to be accumulated therein and thence returned to the low pressure side of said compressor 2, thus completing the power transmission cycle. As an alternative measure, said one or more reciprocating type pneumatic motors 4 may be replaced by a pneumatic motor of the turbo-type, or compressed air turbine 5, as shown in the lower part on Fig. 2. This alternative arrangement is especially suitable for driving of a machine having a higher running speed. These two arrangements are used to transmit a relatively large power to the driven machine. The air reservoirs arranged therein insure that the system will operate substantially at a predetermined pressure level in case of load fluctuations. Because of the fact that the pneumatic motor or motors employed in the present embodiment shown in Fig. 2 are of the reciprocating or alternatively of the rotary type, as the occasion may be, the power transmission will meet simply and satisfactorily the special speed characteristics of the driven machine at issue.

In the third embodiment of the invention shown in Fig. 3, 1 denotes one of the working cylinders of a diesel engine, in which a piston 2 reciprocates. The connecting rod 3 is operatively connected, as in the usual manner, with the crankshaft of the engine. The piston 2 is formed in a stepped piston, the underside of which serves as a compressor piston. Fuel injection valve 4, suction valve 5 and exhaust valve 6 of the engine are arranged in the cylinder cover, while suction valve 7 and delivery valve 8 of the compressor are mounted on the combined cylinder 1. The air delivered by the compressor is conveyed through piping 21 into a high pressure reservoir 9, as in the case of precedent embodiments, to be accumulated therein. 10 represents a working cylinder of a pneumatic motor of the double-acting type, the suction sides of which are connected through piping 22 to said high pressure reservoir 9. The piston 11 is arranged to reciprocate therein and connected through piston rod 16, crosshead 17 and connecting rod 18 with a driven member, for instance, a driving axle of a locomotive. Suction valves 12, 13 and exhaust valves 14, 15 are arranged in the cylinder 10 in the manner known per se. The air discharged from said pneumatic motor is conveyed through piping 23 into a low pressure air reservoir 19, to which is attached a small auxiliary air compressor 20 serving for replenishing possible leakage loss and thus maintaining the pressure prevailing in the low pressure circuit at a predetermined value.

In the present embodiment, the engine cylinder is combined with that of the air compressor as already mentioned, the piston being formed in a stepped one. Further, the compression ratio of the compressor is selected at a relatively lower value, the pressure in the low pressure circuit amounting to 10 kg./sq. cm. or higher. The last mentioned feature makes it possible to employ a higher mean effective pressure of the compressor and thus a small size piston or pistons therefor. Based upon this feature, the utilization of underside of the engine piston as the compressor piston is realized in the present embodiment.

The working mode of the above mentioned system is as follows:

Air is charged by the auxiliary air compressor 20 into the low pressure reservoir 19 till a pressure of, say 10 kg./sq. cm. is reached. Then, the diesel engine is brought into running, thus the combined air compressor further compressing the air coming from said reservoir 19 to an elevated pressure, say 20 kg./sq. cm. and charging it into the second reservoir 9. The air is thence delivered through piping 22 and suction valves 12, 13 to motor cylinder 10, by which the double acting piston 11 is reciprocated to and fro in said cylinder. Power is thus transmitted through piston rod 16, crosshead 17 and connecting rod 18 to the driven member, for instance, a driving wheel of a locomotive. The expanded air in the cylinder 10 is discharged therefrom through delivery valves 14, 15 and piping 23 into the first or low pressure reservoir 19, thus completing the transmission cycle.

In the present embodiment, no power is derived from the crankshaft of the engine-compressor combination and the crankshaft serves mainly for transmitting the compressive forces caused by a set of pistons arranged in a row, so that the shaft may be of smaller size and simpler construction as compared with that in a corresponding diesel engine of the same output. The crankshaft in this case may be more easily manufactured at a lower cost and have practically no troubles caused by torsional vibrations, shaft breakage and the like as in the normal plant.

In the fourth embodiment of the invention illustrated in Fig. 4, 1 denotes the opposed pistons of a free piston type diesel engine and 2 represents air compressor pistons united therewith, thus constituting two stepped pistons. The outer sides of the larger pistons 2 serve as main compressor pistons, while the inner sides of the pistons 2 act as the scavenging air compressor ones. The engine pistons 1 reciprocate in the main cylinder 3, which is provided with a plurality of fuel injection nozzles 4. Each of the scavenging compressor cylinders is provided with a suction valve 5 as well as with a delivery valve 6 as in the usual manner. A scavenging air cylinder 7 is arranged around the main engine cylinder 3 and made integral with said scavenging compressor cylinder. A plurality of scavenging ports 8 as well as exhaust ports 9 are arranged, the latter leading through piping 19 to an air heater 13. The compressor cylinders 10 serve, as above mentioned, for the main compressors for working air as well as for the auxiliary compressors to deliver the scavenging air for the engine. The main compressors are, as known per se, provided with suction and delivery valves 11 and 12 in the cylinder covers. The delivery sides of the main compressors are connected through piping 20, air heater 13 and piping 21 to a high pressure air reservoir 17, which is, in turn, connected through piping 22 to the suction side of a pneumatic motor of the reciprocating type 15 or alternatively of the turbo-type 16, depending upon the speed characteristics of the machine to be driven (not shown). The air discharged from the motor 15 or 16 is conveyed through piping 23 to an intercooler 14, which is connected through piping 24 by way of a lower pressure air reservoir 18 or directly to the suction sides of the main compressors of the main cylinder.

The mode of operation of the above mentioned embodiment is as follows:

When the engine pistons 1 move inwards to compress the air supplied through scavenging ports 8 and arrive nearly at their inside dead points, the fuel is supplied through the fuel injection nozzles 4 into thus highly heated air in the engine cylinder 3, resulting in a combustion of the fuel. Thus generated combustion gases expand and drive the engine pistons outwards to initiate the expansion stroke. When the pistons are brought nearly at their outside dead points, the exhaust ports 9 open to discharge the combustion gases and then the scavenging ports 8 are opened to introduce the scavenging air accumulated in the air chamber 7 and thereby to drive the residual gases out from the cylinder through exhaust ports 9, thus the combustion gases being almost completely replaced by the fresh air of a relatively lower pressure. During the expansion stroke of the engine, energy is transmitted from the combustion gases through engine pistons 1 to compressor pistons 2, which then compress the air in the main compressor chambers 10 and deliver it through delivery valves 12. When the pistons arrive at their outside dead points, the compressed air contained in the clearance spaces of the compressor cylinders 10 pushes them back towards their inside dead points to initiate again the compression stroke of the engine, the movement of the pistons being further assisted by the influence of the introduced compressed air through inlet valves 11 from the low pressure circuit of the system in the course of this compression stroke. Although not shown in the drawing, there is provided a suitable synchronizing mechanism, such as linkage or rack and pinion mechanism to insure the correlated, properly timed relations between both side pistons. The air compressed by the main compressor pistons 2 in the cylinders 10 is conveyed through delivery valves 12 and piping 20 to air heater 13, wherein it is heated by the exhaust gases discharged from the engine cylinder 3. On the other hand, the air introduced through suction valves 5 from the atmosphere into the scavenging air cylinders during the expansion stroke of the engine, is compressed by the opposite sides of said pistons 2 during the compression stroke of the engine and delivered through delivery valves 6 into the air chamber 7 to be accumulated therein, said air serving as the scavenging air for the engine already explained hereinbefore. The compressed air heated, as abovementioned, in the air heater 13 increases in its temperature and pressure, and, after accumulated in the high pressure reservoir 7 if necessary, carries out the necessary work, when it expands in the pneumatic motor 15 or 16 to drive the machine to be driven, thus completing the power transmission. The discharged air from said motor has a relatively higher temperature, resulting from the main feature of the present system, which operates with a relatively lower compression ratio of the main compressors with a lower temperature drop during the adiabatic expansion. The relatively hot discharged air is then cooled in the intercooler 14 and thus cooled air to a substantial degree is thence supplied through inlet valves 11 into the main compressor cylinders 10 to initiate again the abovementioned cycle and so on.

Now assuming that the efficiency of the free piston type diesel engine be 35%, that of the main compressors 90% and that of the pneumatic motor of the reciprocating type 90%, the overall efficiency will substantially amount to:

$$0.35 \times 0.9 \times \frac{273 + 200}{273 + 100} = 0.359$$

wherein the quotient represents an increase in efficiency obtained by the provision of said air heater, the temperatures of the air being assumed 100 and 200° C. at the inlet and the outlet, respectively. This value is somewhat higher than that found in the normal diesel engine. The overall efficiency will be somewhat decreased, when a turbo-type pneumatic motor is employed.

Although certain particular embodiments of the invention are herein disclosed for purpose of explanation, further modifications thereof, after study of this specification, will be apparent to those skilled in the art to which the invention pertains. Reference should accordingly be had to the appended claims in determining the scope of the invention.

What is claimed as new and desired to be secured by Letters Patent is:

A pneumatic power transmission system using compressed air recirculating in a closed circuit; comprising a free piston type diesel engine having a main cylinder, a compressor cylinder surrounding said main cylinder, a pair of opposed free pistons in said main cylinder, air compressor pistons fixed to said free pistons and being disposed in said compressor cylinder, means dividing the space between said main cylinder and said compressor cylinder to form compressor chambers at the ends of said compressor cylinder and scavenging air chambers about said main cylinder, scavenging air ports for connecting said scavenging air chambers with the interior of said cylinder, the air compressor pistons serving as main compressors delivering the compressed air as transmission medium and the free pistons being employed for producing scavenging air necessary for said engine, an air heater to heat the compressed air delivered from said main compressors by the exhaust gases discharged from said engine, a high pressure air reservoir, a pneumatic motor operatively connected with the member to be driven, said high pressure reservoir accumulating the air in the high pressure air circuit between said main compressors and said pneumatic motor and said motor being driven by the air in the last mentioned circuit, intercooler means arranged in the low pressure air circuit between said pneumatic motor and said main compressors, and a low pressure air reservoir arranged in the last mentioned low pressure circuit when necessary, said low pressure air reservoir accumulating the air in the low pressure air circuit.

References Cited in the file of this patent

UNITED STATES PATENTS

| | | |
|---|---|---|
| 832,653 | Bronder | Oct. 9, 1906 |
| 910,237 | Schmick | Jan. 19, 1909 |
| 965,285 | Dunlop | July 26, 1910 |
| 1,380,795 | Graziano et al. | June 7, 1921 |
| 1,887,633 | Geiger | Nov. 15, 1932 |
| 1,920,104 | Pateras Pescara | July 25, 1933 |
| 2,202,298 | Park | May 28, 1940 |
| 2,581,600 | Pateras Pescara | Jan. 8, 1952 |

FOREIGN PATENTS

| | | |
|---|---|---|
| 316,679 | Great Britain | Aug. 2, 1929 |